(12) United States Patent
Guenter et al.

(10) Patent No.: US 10,334,181 B2
(45) Date of Patent: Jun. 25, 2019

(54) DYNAMICALLY CURVED SENSOR FOR OPTICAL ZOOM LENS

(71) Applicant: Microsoft Technology Licensing, LLC, Redmond, WA (US)

(72) Inventors: Brian K. Guenter, Redmond, WA (US); Neel S. Joshi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/720,872

(22) Filed: Dec. 19, 2012

(65) Prior Publication Data

US 2014/0049683 A1 Feb. 20, 2014

Related U.S. Application Data

(60) Provisional application No. 61/684,967, filed on Aug. 20, 2012.

(51) Int. Cl.
| | |
|---|---|
| *H04N 5/262* | (2006.01) |
| *H04N 5/225* | (2006.01) |
| *H04N 5/369* | (2011.01) |
| *G03B 3/04* | (2006.01) |
| *G03B 3/10* | (2006.01) |

(52) U.S. Cl.
CPC ............... *H04N 5/262* (2013.01); *G03B 3/04* (2013.01); *G03B 3/10* (2013.01); *H04N 5/225* (2013.01); *H04N 5/2253* (2013.01); *H04N 5/3696* (2013.01)

(58) Field of Classification Search
CPC .... H04N 5/335; H04N 3/1556; H04N 3/1581; H04N 3/1575

USPC ....... 348/294, 374, 493, 249, 250, 281, 282, 348/298, 302, 311, 373; 396/118, 248
See application file for complete search history.

(56) References Cited

U.S. PATENT DOCUMENTS

| | | | |
|---|---|---|---|
| 1,347,673 | A | 7/1920 | Bishop |
| 3,958,257 | A | 5/1976 | Johnson |
| 3,971,051 | A | 7/1976 | Baker et al. |

(Continued)

FOREIGN PATENT DOCUMENTS

| | | |
|---|---|---|
| CN | 101159281 A | 4/2008 |
| JP | 10341372 A | 12/1998 |

(Continued)

OTHER PUBLICATIONS

Schurman, Kyle, "Human Eye Camera Adds Zoom", Retrieved on: Sep. 28, 2012, Retrieved at: <<http://cameras.about.com/od/futuretechnologies/a/Human-Eye-Camera-Adds-Zoom.htm>>, 1 page.

(Continued)

*Primary Examiner* — Xi Wang

(57) ABSTRACT

The subject disclosure is directed towards an image sensor that is controllable curved to adapt for differences in lens focal lengths. Variable data such as focal length data, measured curvature data and/or image quality data is received at a curve controller that curves the sensor based upon the variable data. In one aspect, a camera is provided with a lens having a variable focal length and a sensor capable of being dynamically curved. A curve controller receives image quality data and iteratively uses the image quality data to adjust the curvature to attempt to increase the image quality of a subsequent image to be captured.

20 Claims, 8 Drawing Sheets

(56) References Cited

U.S. PATENT DOCUMENTS

| | | | |
|---|---|---|---|
| 3,998,527 | A | 12/1976 | Ikeda et al. |
| 5,270,825 | A | 12/1993 | Takasugi et al. |
| 5,602,682 | A | 2/1997 | Ito et al. |
| 5,644,396 | A | 7/1997 | Hopkins, II |
| 6,455,931 | B1* | 9/2002 | Hamilton, Jr. .... H01L 27/14601 250/332 |
| 6,556,349 | B2 | 4/2003 | Cox et al. |
| 6,774,635 | B1* | 8/2004 | Gerald et al. ................. 324/321 |
| 7,110,189 | B2 | 9/2006 | Koike |
| 7,317,580 | B2 | 1/2008 | Kogo et al. |
| 7,317,585 | B2 | 1/2008 | Liao |
| 7,332,733 | B2 | 2/2008 | Jorritsma et al. |
| 7,390,687 | B2* | 6/2008 | Boettiger ......... H01L 27/14601 257/E27.13 |
| 7,598,996 | B2* | 10/2009 | Wenstrand et al. ........... 348/353 |
| 7,626,621 | B2* | 12/2009 | Ito et al. ...................... 348/294 |
| 8,014,076 | B2 | 9/2011 | Suzuki et al. |
| 2002/0096629 | A1 | 7/2002 | Korein |
| 2002/0154319 | A1 | 10/2002 | Yoshizawa et al. |
| 2005/0030408 | A1 | 2/2005 | Ito et al. |
| 2006/0044463 | A1 | 3/2006 | Talley et al. |
| 2006/0103754 | A1 | 5/2006 | Wenstrand et al. |
| 2006/0279648 | A1* | 12/2006 | Senba et al. .................. 348/294 |
| 2008/0081396 | A1* | 4/2008 | Hong et al. ..................... 438/70 |
| 2008/0144186 | A1* | 6/2008 | Feng ........................ G02B 3/14 359/666 |
| 2009/0086331 | A1 | 4/2009 | Gunasekaran et al. |
| 2009/0195645 | A1 | 8/2009 | Kanade et al. |
| 2011/0032386 | A1 | 2/2011 | Tsai et al. |
| 2012/0056991 | A1 | 3/2012 | Zund |
| 2012/0120303 | A1 | 5/2012 | Yamanaka |
| 2012/0162483 | A1 | 6/2012 | Sutton et al. |
| 2012/0188436 | A1 | 7/2012 | Ozaki |
| 2012/0275030 | A1* | 11/2012 | Kong ................... H04N 5/2254 359/665 |
| 2013/0003196 | A1 | 1/2013 | Guenter et al. |

FOREIGN PATENT DOCUMENTS

| | | |
|---|---|---|
| JP | 2005278133 A | 10/2005 |
| JP | 2009522591 A | 6/2009 |
| JP | 2012118389 A | 6/2012 |
| TW | 201104295 A | 2/2011 |
| WO | 2012097163 A1 | 7/2012 |

OTHER PUBLICATIONS

International Search Report & Written Opinion for PCT Patent Application No. PCT/US2013/055227, dated Nov. 15, 2013, Filed Date: Aug. 16, 2013, 8 pages.

Rim, et al., "The Optical Advantages of Curved Focal Plan Arrays", Retrieved at <<http://ece661web.groups.et.byu.net/notes/curved_fpa.pdf>>, vol. 16, No. 7, Mar. 31, 2008, 7 pages.

Cossairt, et al., "Gigapixel Computational Imaging", Retrieved at <<www.cs.columbia.edu/CAVE/projects/gigapixel/>>, IEEE International Conference on Computational Photography (ICCP), Mar. 2011, 8 pages.

"Office Action Issued in Australian Patent Application No. 2013306138", dated Mar. 17, 2017, 3 Pages.

"Office Action Issued in Mexico Patent Application No. MX/a/2015/002286" dated Mar. 1, 2017, 4 Pages.

"Office Action Issued in Japan Patent Application No. 2015-528543", dated May 23, 2017, 3 Pages. (W/o English Translation).

"Second Office Action and Search Report Issued in Chinese Patent Application No. 201380044445.3", dated Aug. 2, 2017, 13 Pages.

"Office Action Issued in Russian Patent Application No. 2015105767", dated Jun. 26, 2017, 10 Pages.

"Office Action Issued in Australian Patent Application No. 2013306138", dated Sep. 16, 2016, 3 Pages.

"Office Action Issued in Australian Patent Application No. 2013306138", dated Dec. 21, 2016, 3 Pages.

"First Office Action and Search Report Issued in Chinese Patent Application No. 201380044445.3", dated Nov. 18, 2016, 15 Pages.

"Third Office Action Issued in Chinese Patent Application No. 201380044445.3", dated Feb. 24, 2018, 6 Pages.

"Office Action Issued in Japanese Patent Application No. 2015-528543", dated Feb. 6, 2018, 4 Pages.

"Office Action Issued in Mexican Patent Application No. MX/a/2015/002286", dated Oct. 24, 2017, 4 Pages (W/o English Translation).

"Office Action Issued in Mexican Patent Application No. MX/a/2015/002286", dated Jun. 5, 2018, 7 Pages.

"Office Action Issued in Japanese Patent Application No. 2015-528543", dated Oct. 2, 2018, 7 Pages.

"Office Action Issued in Indian Patent Application No. 320/CHENP/2015", dated Dec. 3, 2018, 7 Pages.

"Office Action Issued in European Patent Application No. 13753753.6", dated Jul. 2, 2018, 5 Pages.

"Office Action Issued in European Patent Application No. 13753753.6", dated: Feb. 21, 2019, 5 Pages.

"Office Action Issued in Japanese Patent Application No. 2015-528543", dated: Feb. 19, 2019, 3 Pages.

* cited by examiner

DYNAMICALLY CURVED SENSOR FOR OPTICAL ZOOM LENS

BACKGROUND

Optical lens systems do not generally have their best focus on a planar surface. For example, spherical lens systems tend to best focus on a roughly hemispherical surface, called the Petzval surface. Much of the complexity of lens design is in forcing the lens system to achieve best focus on a planar imaging surface, far away from the Petzval surface.

Zoom lenses introduce additional difficulty because the surface of best focus changes as a function of focal length. Because of this, zoom lenses are generally significantly less sharp than fixed focal length, or prime, lenses.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology in which a sensor that captures image data received through a camera lens is configured to be dynamically curved by a curve controller to increase image quality to adapt for differences in focal lengths. In one aspect, variable data is received at the curve controller, and based upon the variable data, the sensor is curved. The variable data may comprise focal length data, measured curvature data and/or image quality data.

In one aspect, a camera comprises a lens having a variable focal length and a sensor capable of being dynamically curved. A curve controller is configured to receive feedback data corresponding to image quality of an image obtained through the lens and captured by the sensor, and adjust the curvature of the sensor based upon the feedback data to attempt to increase image quality of a subsequent image to be captured.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a dynamically curved (e.g., silicon) sensor that has its curvature tuned to a more optimal curvature for each focal length. This results in significantly improved sharpness across the imaging field at any focal length. The sensor curvature reduces the chief ray angle towards zero, which improves uniformity of image surface illumination, and reduces optical crosstalk between pixels in the periphery of the sensor.

In one aspect, there is provided dynamically varying sensor curvature synchronized with changes in focal length of a zoom lens. For a spherical lens system, the optimal focal surface is approximately hemispherical and has a radius of curvature equal to the focal length of the lens.

Also provided is measuring sensor curvature data and synchronizing the sensor curvature with the lens focal length. The actual curvature may be measured, or the curvature's effect with respect to image sharpness may be determined as the synchronizing measure.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and optical sensing in general.

Figure 1:
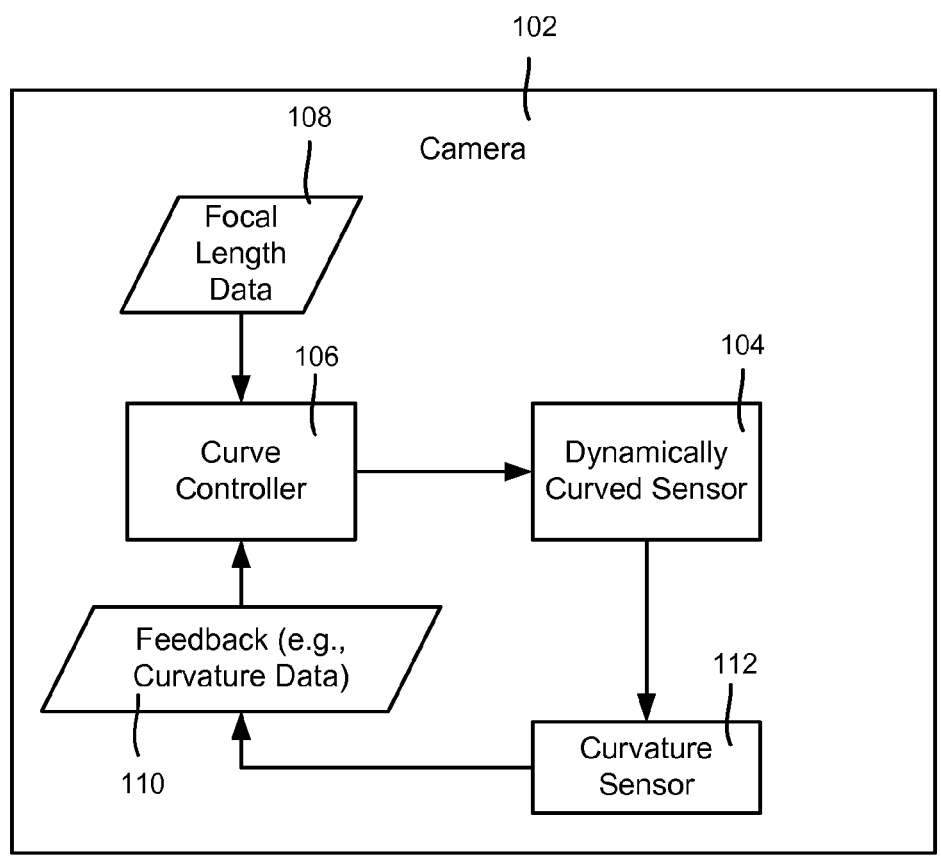
FIG. 1 is a block diagram showing example components configured for dynamically curving a sensor, according to one example embodiment.

As generally represented in FIG. 1, an exemplified camera 102 includes a dynamically curved sensor 104. A curve controller 106 dynamically controls the curvature of the curved sensor 104 based upon focal length data 108 and/or feedback, such as curvature data as sensed by a curvature sensor 110.

With respect to curvature sensing, the curvature can be measured indirectly, for example, by measuring the distance from the center of the sensor 104/204 surface to a reference position using a variety of non-contact methods. One method comprises a laser illuminator (as part of the curvature sensor 112) offset from the optical axis illuminating the bottom surface of the sensor 104/204. As the sensor curvature varies, the bottom surface moves up or down, causing the reflection of the laser dot to change its position. The change in position may be measured (as part of the curvature sensor 112) with a linear image sensor array and/or a low resolution camera, such as is commonly used in optical mice. A separate mechanism measures the focal length of the lens system to provide the focal length data 108, which is used to dynamically adjust the height of the sensor surface so the sensor curvature adjusts as the lens focal length is varied.

Figure 2:
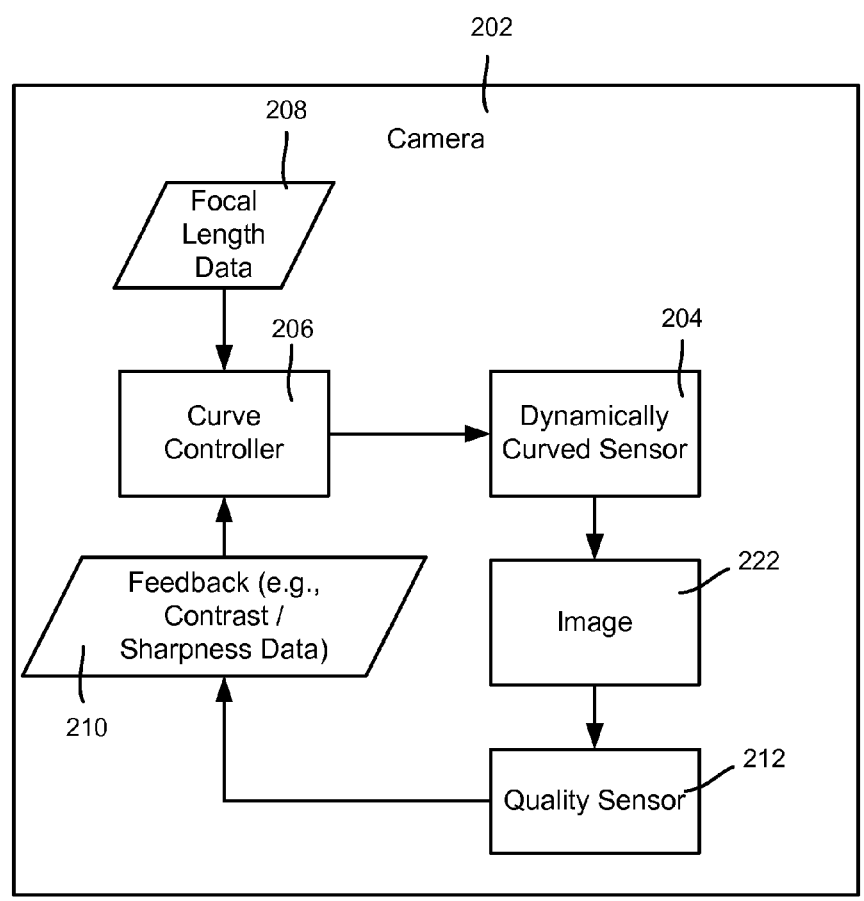
FIG. 2 is a block diagram showing example components configured for dynamically curving a sensor based upon image feedback, according to one example embodiment.

As represented in FIG. 2, (in which components similar to those of FIG. 1 are labeled 2xx instead of 1xx), the feedback 210 need not be a measure of actual physical curvature, but rather the curvature's effect on the image quality, e.g., as measured via contrast/sharpness or the like. For example, an alternative curvature sensor 212, which does not require precise measurements of focal length and sensor distance, may use contrast-based detection of small image regions from the center and periphery of the image sensor 204. The curvature of the sensor surface, and the focusing distance of the lens, may be simultaneously varied to maximize contrast in both the center and peripheral image regions, for example. If the object being imaged is not planar then the optimal sensor curvature may not exactly match lens focal length.

To this end, in a camera 202, a quality sensor 212 provides a quality measure of a currently captured image 222, e.g., at certain sampling regions in the image. In the dynamic curvature technology as described herein, quality detection provides the feedback used by the curve controller 206 to increase quality (e.g., maximize contrast/sharpness) at the various regions, which is relative to the given focal length. Further, note however that focal length data 208 may not be needed, as the curve controller 208 operates based upon feedback from the actual image; however, focal length data 208 may be beneficial in making coarse adjustments to the curved sensor 204, with image feedback adjustment then commencing from a relatively close starting point.

Figure 3:
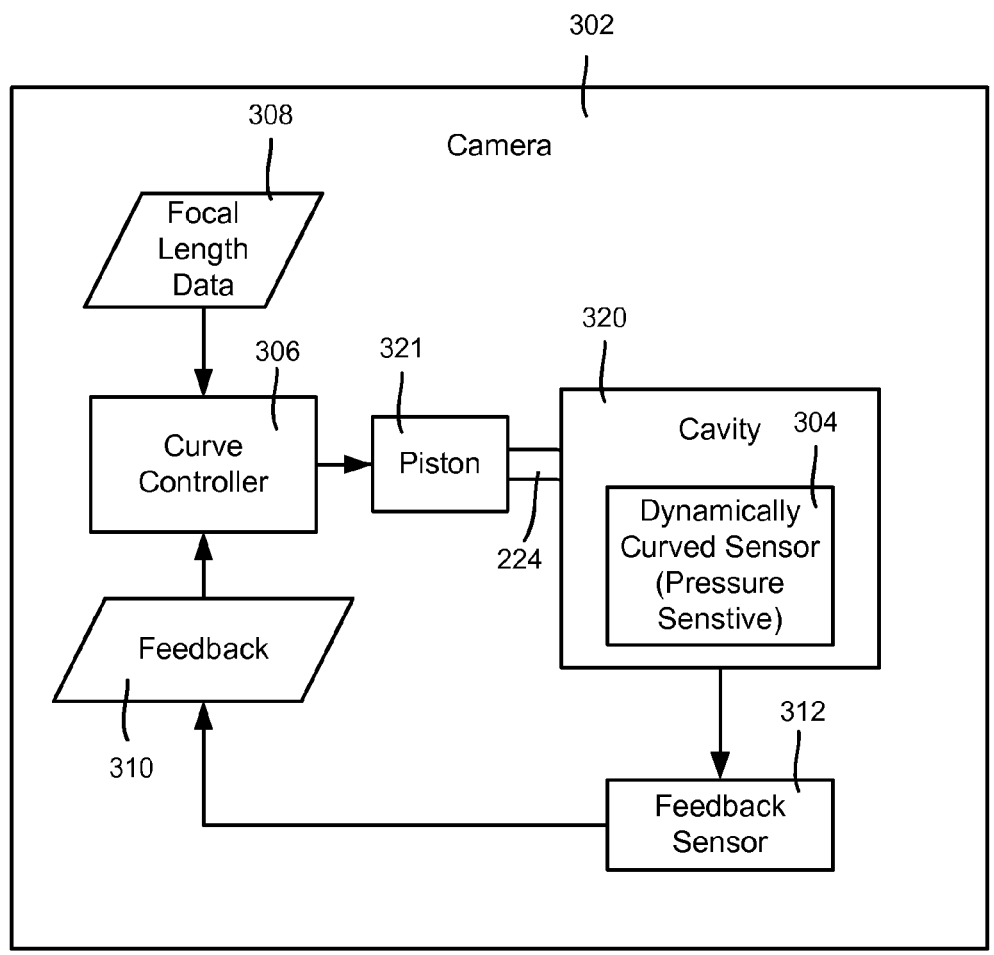
FIG. 3 is a block diagram showing example components configured for dynamically curving a sensor via pressure change according to one example embodiment.

In one example implementation generally represented in FIG. 3, an image sensor silicon chip 304 (corresponding to the curved sensor 104) is suspended across a cavity 320, which is filled with a fluid comprising air or another gas or the like, or a liquid. A pressure control mechanism (e.g., a piston 321) is connected by a fluid channel 224 to the cavity 320, and for example moves in and out as controlled by the curve controller 306 to increase and decrease the pressure in the cavity's ambient fluid pressure, causing the sensor 304 to curve. The curvature is synchronized as described above, e.g., via feedback and/or with the focal length data 308 of the zoom lens so that sensor curvature dynamically adjusts as lens focal length varies.

For high degrees of curvature and thick substrates, varying the ambient air pressure may not be sufficient to bend the silicon. In this case, the cavity above the sensor can be filled with air or a non-reactive gas, such as Argon, at higher than ambient pressure. Alternatively the cavity above the sensor can be filled with an optically transparent fluid which is pressurized to make the sensor bend. The index of refraction of the fluid may be accounted for in the optical design of the lens system.

Other ways to change the pressure and/or to change the curvature are feasible. For example, controlled temperature change provides a force than may vary shape, and/or piezoelectric and/or electro/magnetic force may be used to vary shape.

Figure 4A:
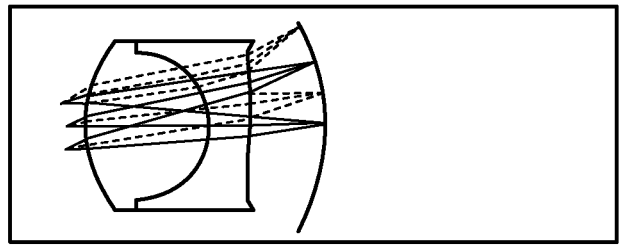
FIGS. 4A and 4B are representations of lenses and dynamically curved sensors, according to example embodiments.
Figure 4B:
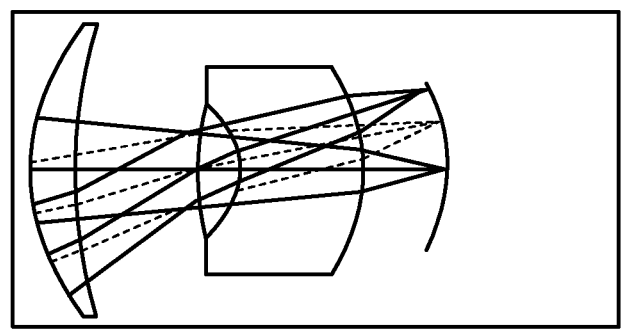

FIGS. 4A and 4B show example lens designs capable of working with dynamically curved sensors. The lens may be matched to the sensor surface, such as via objective functions that maximize sharpness, including but not limited to one or more objective functions directed towards: minimizing optical path length difference, minimizing spot radius, minimizing spot X, spot Y, minimizing angular radius and/or minimizing angular radius in X or Y.

Turning to another aspect, namely manufacturing the curved sensors, the image sensor may be in tension. This is desirable because sensor dark noise decreases when silicon is in tension, and increases when it is in compression. For designs in which the silicon is suspended as a thin membrane and bent under air, or other gas or fluid pressure, the central portion of the sensor is entirely in compression. This region is the region most desirable for image because it comes closest to being hemispherical.

Figure 5A:
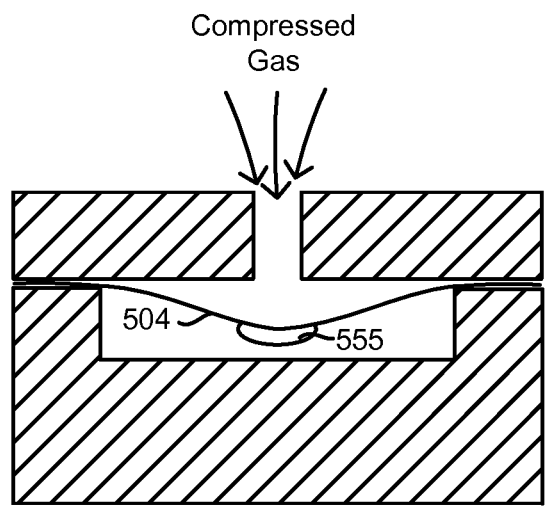
FIGS. 5A and 5B are representations of dynamically curved sensors, including manufactured for tension, according to example embodiments.

Described herein is puts the silicon sensor in tension while maintaining the desirable hemispherical shape across the imaging surface. FIG. 5A shows a dynamically curved sensor 504 having an emphasized central portion 555. The chip may be flat when not pressurized and curve under pressure or another curving force, or may be initially curved to an extent, with the curvature modified by pressure or another curving force.

Figure 5B:
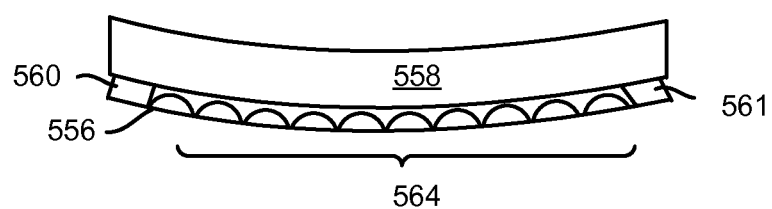

As shown in FIG. 5B, the sensor chip can be placed in tension everywhere by binding the sensor 556 to a carrier 558 made of glass or other material of stiffness less than or equal to silicon. Epoxy or other binding material is shown along the perimeter in areas 560 and 561, with microlenses 564 between the sensor and the carrier 558. By the appropriate choice of carrier material; and thickness, the combined carrier and sensor "sandwich" is designed such that the neutral bending axis passes through the microlenses of the sensor. When the sandwich bends, the silicon sensor layer is completely in tension. Because the neutral bending axis passes through the microlenses, they do not move relative to the carrier, eliminating the potential for damage due to abrasion.

Note that after the silicon is bent, the front carrier surface may be eliminated. More particularly, the silicon chip is bonded at the periphery to the carrier. The carrier is then pressed into a mold carrying the precise shape of the curved sensor. Ultraviolet (UV) curable epoxy may be injected into the back side of the carrier, namely the surface holding the chip, and then cured. The carrier is then released from the chip by dissolving the glue bonds at the periphery of the chip. This avoids introducing interference patterns caused by the close proximity of the carrier and chip surfaces.

Figure 6A:
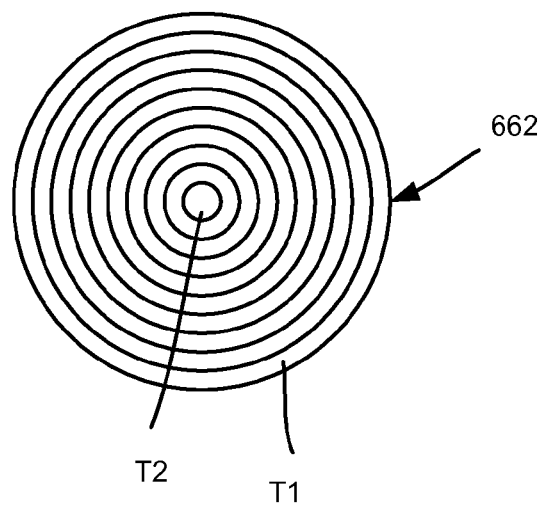
FIGS. 6A and 6B are representations of how a curved sensor may have different thickness and/or stiffness properties for controlled curvature, according to one example embodiment.

The dynamically curved sensor may be manufactured to enhance being pressurized into a desired hemispherical shape. For example, the thickness of the sensor may vary, such as in a radially symmetrical way. This is generally represented in FIG. 6A, where the thickness of a dynamically curved sensor chip 662 varies from a thickness T1 to a thickness T2. The thickness variation may be smooth and/or in discrete steps, and the variation may occur linearly or non-linearly.

Figure 6B:
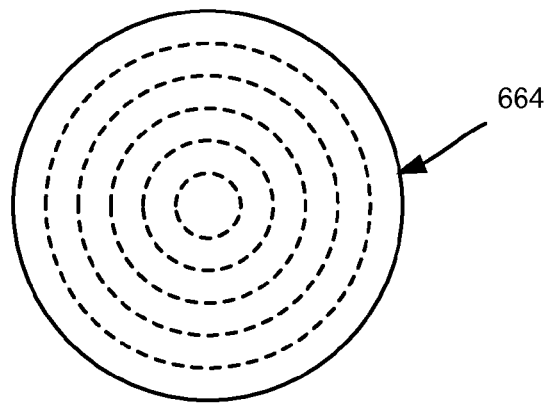

FIG. 6B shows an alternative to thickness variation, namely etching a pattern or the like in the back of a dynamically curved sensor chip 664, to cause bending as desired by etching channels, dots or the like in the chip 664 to make the chip 664 more flexible in some areas, and less in others. This is shown via the dashed lines, which again need not be symmetrical, linear, concentric or smooth.

Figure 7:
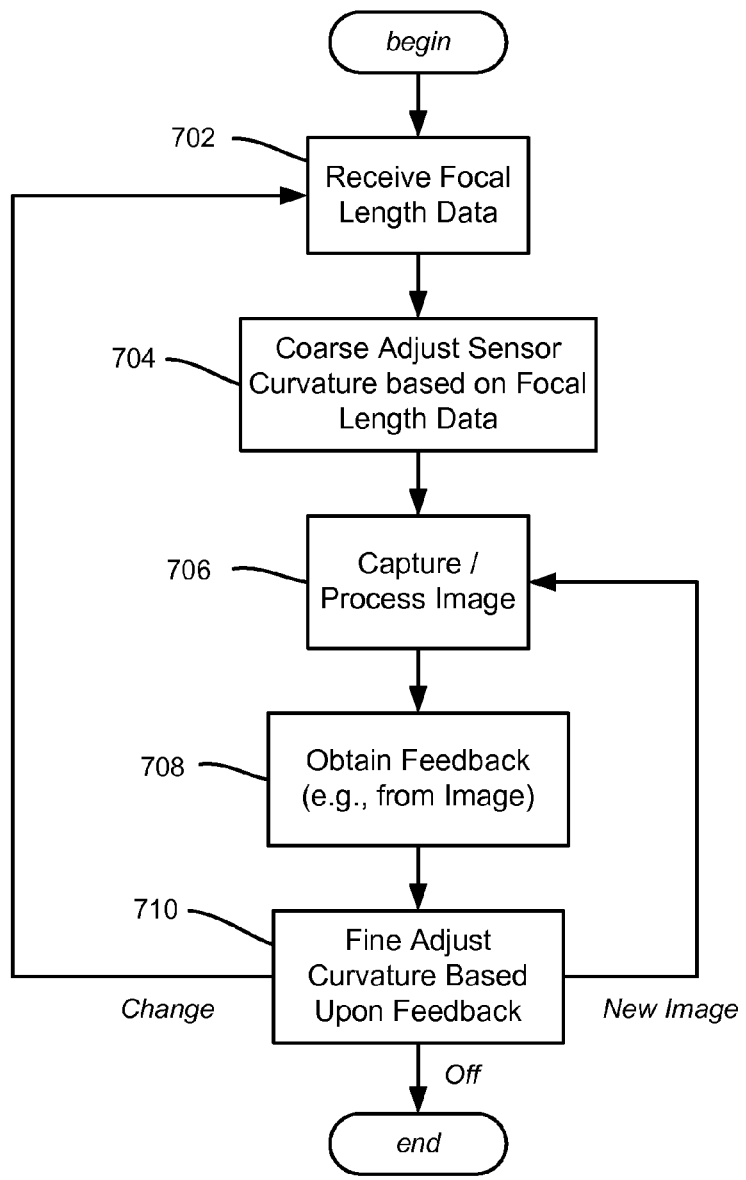
FIG. 7 is a flow diagram representing example steps that may be taken to controllably curve a sensor based upon feedback, according to one example embodiment.

FIG. 7 is a flow diagram showing example steps that may be taken to control curvature of the sensor. In the example of FIG. 7, a coarse adjustment based upon focal length data is first made, as represented by steps 702 and 704. In an embodiment in which coarse tuning is not needed or is not desirable, steps 702 and 704 can be skipped.

Step 706 represents capturing an image and processing the image to obtain the desired feedback data, such as contrast/sharpness data as described above. This may occur as part of an automatic curvature (e.g., calibration) process, or as part of capturing a set of frames, such as with video data.

Step 708 provides the feedback to the curve controller for the given image. For sensing physical/mechanical curvature, rather than (or in addition to) capturing the image at step 706, a measurement of the curvature may be taken. Thus, although not shown, step 706 may instead, or additionally, represent measuring the sensor curvature.

The feedback is used at step 710 to fine tune the curvature, e.g., to attempt to maximize sharpness using certain regions. The feedback is iterative, such as when a new image is available for checking, however depending on the time needed to curve the sensor, this may be every frame, every tenth frame, every half second, and/or the like. The curving may stop at some point, such as when a sufficient sharpness/contrast is reached, or may be regularly occurring so that sharpness/contrast maximization is regularly re-checked. Another example way to stop the fine-curving feedback loop is a sufficient change in the focal length, which in this example causes the process to return to step 702 for a coarse adjustment. The process may continue until the automatic curvature feature is turned off, e.g., when the camera is powered down to save battery, or if the camera operator wants to turn the curvature feature off, e.g., to produce a special effect.

Example Computing Device

As mentioned, advantageously, the techniques described herein can be applied to any device. It can be understood, therefore, that handheld, portable and other computing devices and computing objects of all kinds including stand-alone cameras are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
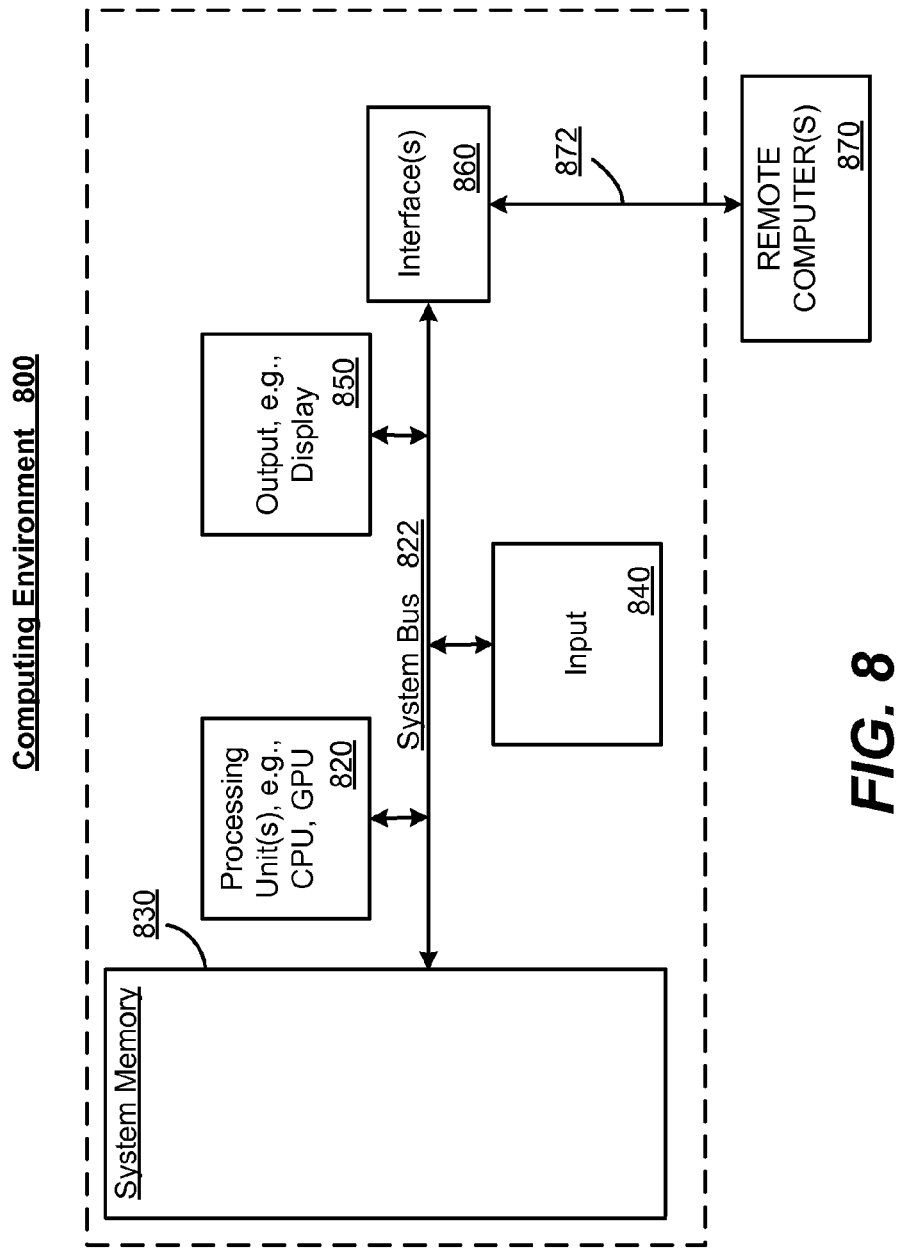
FIG. 8 is a block diagram representing an example environment into which aspects of the subject matter described herein may be incorporated.

FIG. 8 thus illustrates an example of a computing environment 800 in which one or aspects of the embodiments described herein (such as the curve controller) can be implemented, although as made clear above, the computing environment 800 is only one example of a suitable computing environment and is not intended to suggest any limitation as to scope of use or functionality. In addition, the computing environment 800 is not intended to be interpreted as having any dependency relating to any one or combination of components illustrated in the example computing environment 800.

With reference to FIG. 8, an example remote device for implementing one or more embodiments includes a processing unit 820, a system memory 830, and a system bus 822 that couples various system components including the system memory to the processing unit 820.

The environment may include a variety of computer-readable media and can be any available media that can be accessed. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information through input devices 840. A monitor or other type of display device also may be connected to the system bus 822 via an interface, such as output interface 850. In addition to a monitor, other peripheral output devices such as speakers may be connected through output interface 850.

The system may be coupled to one or more remote computers, such as remote computer 870. The remote computer 870 may be a personal computer, a server, a router, a network PC, a peer device or other common network node, or any other remote media consumption or transmission device, and may include any or all of the elements described above. The logical connections depicted in FIG. 8 include a bus such as a USB-based connection, or a wireless networking connection. Also, there are multiple ways to implement the same or similar functionality, e.g., an appropriate API, tool kit, driver code, operating system, control, standalone or downloadable software objects, etc., which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A system comprising:
a lens;
a cavity;
a sensor within the cavity; and
a sensor controller configured to:
receive a current focal length of the lens;
increase a pressure of fluid within the cavity to curve the sensor based on the current focal length of the lens;
upon curving the sensor based on the current focal length of the lens, capture first image data received through a camera lens;
receiving feedback data corresponding to the captured first image data; and
based on the feedback data and the current focal length of the lens, adjust the curve of the sensor to increase image quality of second image data.

2. The system of claim 1 wherein the sensor controller dynamically curves the sensor based upon the current focal length of the lens prior to capturing additional image data.

3. The system of claim 1 wherein the increase in the pressure of fluid within the cavity increases the curve of the sensor.

4. The system of claim 1 wherein the sensor is flat when the fluid within the cavity is not pressurized.

5. The system of claim 1 wherein the cavity is a pressurized cavity, and the sensor controller dynamically curves the sensor by changing pressure in the cavity.

6. The system of claim 5 wherein the pressure in the cavity comprises gas pressure or liquid pressure.

7. The system of claim 5 wherein the sensor controller changes the pressure in the cavity by operating a piston for dynamically curving the sensor.

8. The system of claim 1 wherein the sensor is coupled to a carrier that puts the sensor in tension.

9. The system of claim 1 wherein the sensor has at least two different thicknesses or stiffness properties to provide for hemispherical curvature.

10. The system of claim 1 wherein the sensor has a radially varying thickness.

11. The system of claim 1 wherein the sensor is etched to provide a hemispherical curvature.

12. A method comprising:
receiving a current focal length of a camera lens;
increasing a pressure of fluid within a cavity to curve a sensor within the cavity based on the current focal length of the camera lens;
upon curving the sensor based on the current focal length of the camera lens, receiving feedback data including image data received through the camera lens and captured by the sensor; and
based upon the image data and the current focal length of the camera lens, adjusting the curve of the sensor to increase image quality of subsequent image data.

13. The method of claim 12 wherein receiving the current focal length of the camera lens comprises receiving the current focal length of the camera lens prior to receiving any image data.

14. The method of claim 12 wherein receiving the feedback data comprises receiving measured curvature data of the sensor.

15. The method of claim 12 wherein receiving the feedback data comprises receiving image quality data.

16. The method of claim 12 wherein curving the sensor comprises using the focal length to coarsely adjust the sensor curvature, and using the image quality data to finely adjust the sensor curvature by iterating over image data obtained from a plurality of captured images.

17. A camera comprising:
a lens having a variable focal length;
a cavity;
a sensor within the cavity, the sensor capable of being dynamically curved; and
a curve controller configured to:
receive a current focal length of the lens;
increase a pressure of fluid within the cavity to curve the sensor based on the current focal length of the lens;
upon curving the sensor based on the current focal length of the lens, capture first image data of an image received through the lens and captured by the sensor;
receive feedback data corresponding to image quality of the image; and adjust a curvature of the sensor based upon the feedback data and the current focal length of the lens, to increase image quality of a subsequent image to be captured.

18. The camera of claim 17 wherein the curvature of the sensor is controlled by pressure, and wherein the camera further comprises, a pressure control mechanism controlled by the curve controller to adjust the curvature of the sensor.

19. The camera of claim 17 wherein the curve controller is further configured to adjust the curvature of the sensor based upon the current focal length.

20. The camera of claim 17 wherein the sensor has at least two different thicknesses at different locations on the sensor, or at least two varying stiffness properties at different locations on the sensor, or both at least two different thicknesses at different locations on the sensor and at least two varying stiffness properties at different locations on the sensor.

* * * * *